(12) United States Patent
Zimmerman (10) Patent No.: US 12,171,150 B2
(45) Date of Patent: Dec. 24, 2024

(54) SHANK MOUNTING FOR TILLAGE IMPLEMENT

(71) Applicant: Raymond Zimmerman, Cantril, IA (US)

(72) Inventor: Raymond Zimmerman, Cantril, IA (US)

( * ) Notice: Subject to any disclaimer, the term of this patent is extended or adjusted under 35 U.S.C. 154(b) by 302 days.

(21) Appl. No.: 17/836,104

(22) Filed: Jun. 9, 2022

(65) Prior Publication Data

US 2022/0394911 A1  Dec. 15, 2022

Related U.S. Application Data

(60) Provisional application No. 63/209,158, filed on Jun. 10, 2021.

(51) Int. Cl.
*A01B 35/28* (2006.01)
*A01B 49/02* (2006.01)
*E02F 9/28* (2006.01)

(52) U.S. Cl.
CPC ............ *A01B 35/28* (2013.01); *A01B 49/027* (2013.01); *E02F 9/28* (2013.01); *E02F 9/2816* (2013.01); *E02F 9/2833* (2013.01); *E02F 9/2883* (2013.01)

(58) Field of Classification Search
CPC ....... A01B 35/20; A01B 35/22; A01B 35/225; A01B 35/24; A01B 35/26; A01B 35/28; A01B 15/16; A01B 63/00; A01B 63/008; A01B 63/24; A01B 63/26; A01B 63/28; A01B 63/30; A01B 63/32; E02F 9/28; E02F 9/2816; E02F 9/2825; A01C 5/064; A01C 7/205
See application file for complete search history.

(56) References Cited

U.S. PATENT DOCUMENTS

| | | | |
|---|---|---|---|
| 8,261,845 B2 * | 9/2012 | Palen | A01B 63/22 172/396 |
| 8,596,374 B2 * | 12/2013 | Kile | A01B 61/046 172/265 |
| 2002/0043382 A1 * | 4/2002 | Ryan | A01B 61/046 172/497 |
| 2018/0146609 A1 * | 5/2018 | Andrews | A01B 35/28 |
| 2020/0352096 A1 * | 11/2020 | Fay, II | A01D 34/661 |
| 2021/0127548 A1 * | 5/2021 | DeKam | A01B 15/20 |

FOREIGN PATENT DOCUMENTS

| | | | | |
|---|---|---|---|---|
| WO | WO-2011127536 A1 * | 10/2011 | | E02F 9/2825 |
| WO | WO-2020251462 A1 * | 12/2020 | | A01B 35/22 |

* cited by examiner

*Primary Examiner* — Jamie L Mcgowan
*Assistant Examiner* — Audrey L Lusk
(74) *Attorney, Agent, or Firm* — Goodhue, Coleman & Owens, P.C.

(57) ABSTRACT

A shank mounting assembly for connecting a shank to a row unit of a tillage implement is provided. The shank mounting assembly includes a fixed portion, the fixed portion comprising a left wall and a right wall extending outwardly and a plurality of slots in each of the left wall and the right wall. The shank mounting assembly further includes a removable portion comprising a plate having a first set of hooks for mating with the plurality of slots in the left wall and a second set of hooks for mating with the plurality of slots in the right wall. The shank mounting assembly further includes a handle assembly operatively connected to the plate.

9 Claims, 8 Drawing Sheets

SHANK MOUNTING FOR TILLAGE IMPLEMENT

RELATED APPLICATIONS

This application claims priority to U.S. Provisional Patent Application No. 63/209,158, filed Jun. 10, 2021, hereby incorporated by reference in its entirety.

FIELD OF THE INVENTION

The present invention relates to agricultural implements. More particularly, but not exclusively, the present invention relates to shank mounting such as may be used with a tillage implement.

BACKGROUND

Tillage implements typically include shanks to which earth working implements are attached. Making adjustments to the shanks such as mounting heights can be time consuming and tedious work, especially where a large number of row units are involved. Similarly, removing a shank can also be time-consuming. Therefore, what is needed is an improved method, apparatus, and system for mounting shanks in tillage implements.

SUMMARY

Therefore, it is a primary object, feature, or advantage of the present invention to improve over the state of the art.

It is a further object, feature, or advantage of the present invention to improve tillage implements.

It is a still further object, feature, or advantage of the present invention to provide for easily mounting and adjusting shanks used on tillage equipment.

Another object, feature, or advantage is to allow for shanks to be quickly and easily removed and replaced such as to replace a strip freshener shank with a strip till shank or other type of shank.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a tillage implement is provided. The tillage implement includes a frame, a row unit attached to the frame, and a shank having a connecting end and an opposite tool-supporting end, the shank extending downwardly from the connecting end to the tool-supporting end. The tillage implement further includes a shank mounting assembly for connecting the shank to the row unit, the shank mounting assembly comprising a fixed portion mounted to the row unit and a removable portion. The fixed portion includes a left wall and a right wall extending outwardly and a plurality of slots in each of the left wall and the right wall. The removable portion includes a plate having a first set of hooks for mating with the plurality of the slots in the left wall and a second set of hooks for mating with the plurality of the slots in the right wall. The tillage implement further includes a handle assembly operatively connected to the plate. The connecting end of the shank is sized and shaped to fit into the fixed portion of the at least one shank mounting assembly and wherein in an operative position the connected end of the shank is secured into the fixed portion with the removable portion. The connecting end of the shank has an aperture for fitting on a pin for supporting the shank while the connecting end of the shank is positioned within the fixed portion of the shank mounting assembly. The removable portion of the shank mounting assembly may further include a slot extending through a central portion of the plate. There may be a pin integrated into the handle assembly for extending through the slot extending through the central portion of the plate. There may be an aperture in the plate and an aperture in the handle assembly wherein in an operative position the aperture in the plate and the aperture in the handle assembly are aligned. There may be a spring biased bolt inserted through the aperture in the plate and the aperture in the handle assembly.

According to another aspect a shank mounting assembly for connecting a shank to a row unit of a tillage implement is provided. The shank mounting assembly includes a fixed portion, the fixed portion comprising a left wall and a right wall extending outwardly and a plurality of slots in each of the left wall and the right wall. The shank mounting assembly further includes a removable portion comprising a plate having a first set of hooks for mating with the plurality of the slots in the left wall and a second set of hooks for mating with the plurality of the slots in the right wall. The shank mounting assembly further includes a handle assembly operatively connected to the plate. There may be a slot extending through a central portion of the plate. There may be a pin integrated into the handle assembly for extending through the slot extending through the central portion of the plate. There may be an aperture in the plate and an aperture in the handle assembly wherein in an operative position the aperture in the plate and the aperture in the handle assembly are aligned. There may be a spring biased bolt inserted through the aperture in the plate and the aperture in the handle assembly. A tillage implement may include multiple row units with one or more shanks with shank mounting assembly.

A method of reconfiguring a tillage implement having at least row unit includes providing a shank for a row unit, the shank having a connecting end and an opposite tool-supporting end, the shank extending downwardly from the connecting end to the tool-supporting end, a shank mounting assembly for connecting a shank to the row unit, the shank mounting assembly comprising a fixed portion mounted to the at least one row unit and a removable portion, the fixed portion comprising: a left wall and a right wall extending outwardly and a plurality of slots in each of the left wall and the right wall; the removable portion comprising: a plate having a first set of hooks for mating with the plurality of the slots in the left wall and a second set of hooks for mating with the plurality of the slots in the right wall and a handle assembly operatively connected to the plate. The method further includes removing the shank for the at least one row unit.

BRIEF DESCRIPTION OF THE DRAWINGS

Illustrated embodiments of the disclosure are described in detail below with reference to the attached drawing figures, which are incorporated by reference herein.

DETAILED DESCRIPTION

A tillage shank is a part of a tillage implement which generally has an attached tillage point. In operation, it may be desirable to adjust the depth of the shank up and down in order to alter the depth of penetration of the attached tillage point. It may also be desirable to remove an attached tillage point and replace it with a different tillage point. Such adjustments may be appropriate when working in different fields.

Figure 1:
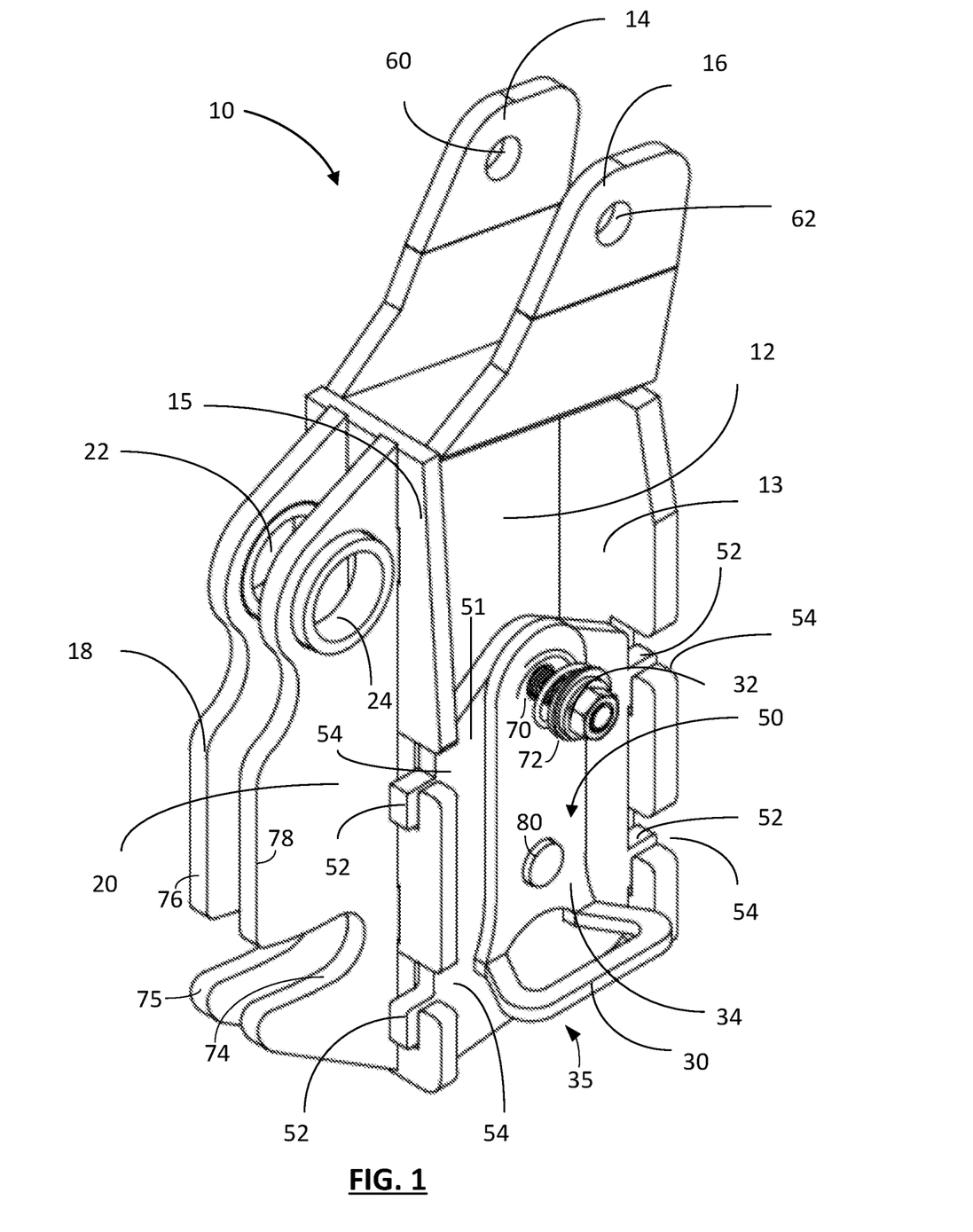
FIG. 1 is a perspective view of one example of a shank mounting assembly.

FIG. 1 is a perspective view of one example of a shank mounting assembly 10. For purposes of illustration, the shank is not shown so that the interaction between the securing assembly 50 and the remaining portions of the shank mounting assembly 10 can be more readily viewed.

The shank mounting assembly includes a surface 12 with left and right sidewalls 15, 13 extending outwardly therefrom thereby defining a cavity in which a connection portion of the shank may be placed. Each of the left side wall 15 and the right sidewall 13 have a plurality of slots 54.

A removeable securing assembly 50 is shown which includes a central flat plate 51 with right angle hooks 52 extending outwardly from the sides so as to mate with the slots 54 of the shank mounting assembly. A handle assembly 35 is shown with an arm 34 which is biased with a bias assembly 32 which may include a bolt 70 and a nut and a spring 72. A handle 30 is shown extending from a bottom end of the arm 34. An integrated pin 80 in the handle assembly 80 extends through a slot (not shown in this view) of the central flat plate 51.

At the top of the shank mounting assembly 10 are bracket members 14, 16 each with respective openings 60, 62 so that a bolt may be positioned therethrough. Openings 22, 24 are also shown in members 76, 78 such that the members 76, 78 may sandwich a part of the row unit and a bolt through the openings 22, 24 may secure the shank mounting assembly 10 to the row unit. In addition, notches 74, 75 in the members 78, 76 may receive a shaft of a bolt which further secures the shank mounting assembly 10.

Figure 2:
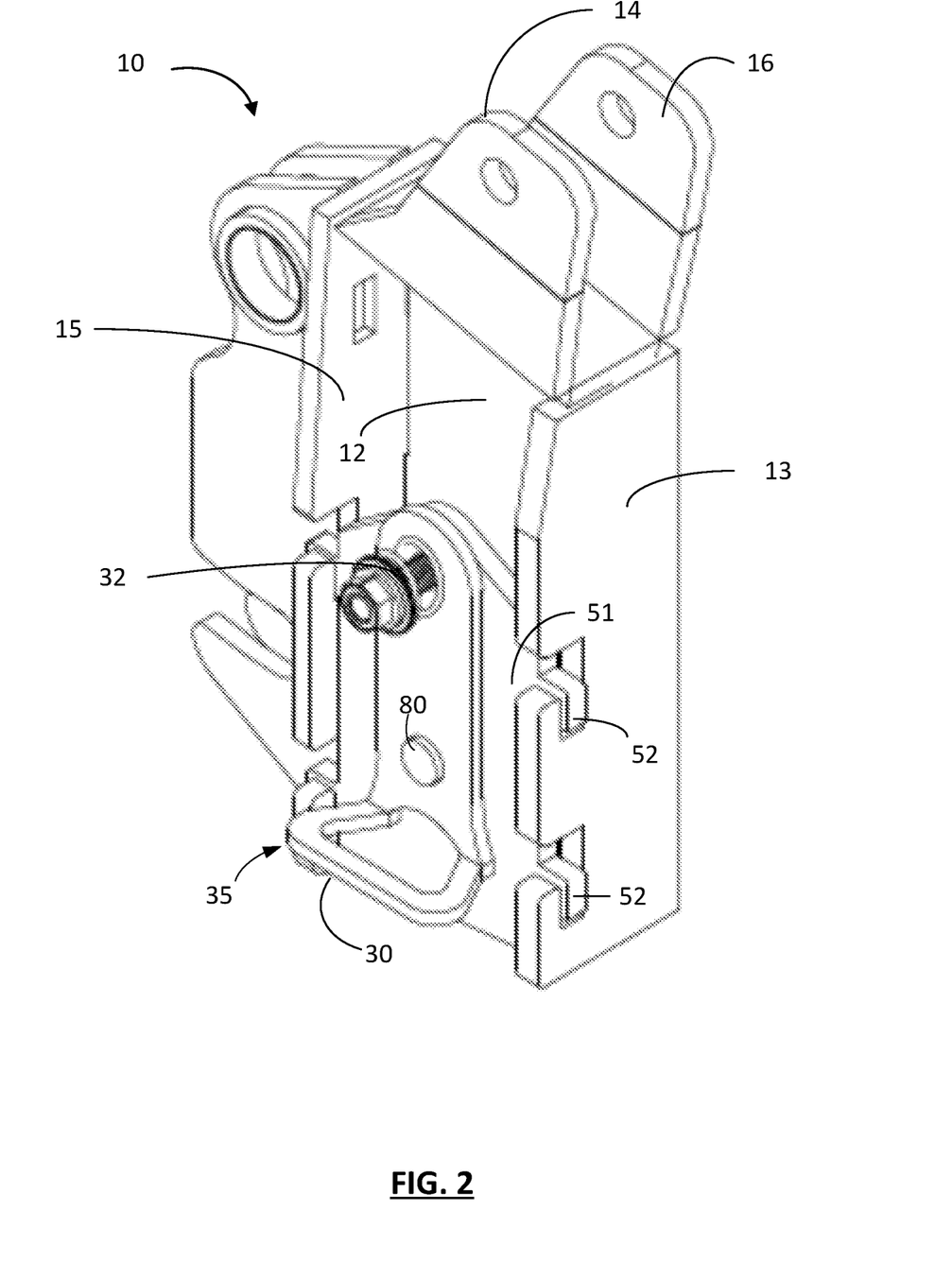
FIG. 2 is another view of the shank mounting assembly.

FIG. 2 provides another view of the shank mounting assembly 10. As shown in FIG. 2, the shank mounting assembly 10 has a surface 12 with left and right sidewalls 15, 13 extending outwardly therefrom. The central flat plate 51 is shown with hooks 52 extending therefrom to secure the flat plate in position thereby securing it in place. The handle assembly 35 has a handle 30 on one end. An integrated pin 80 of the handle assembly extends through the central flat plate 51.

Figure 3:
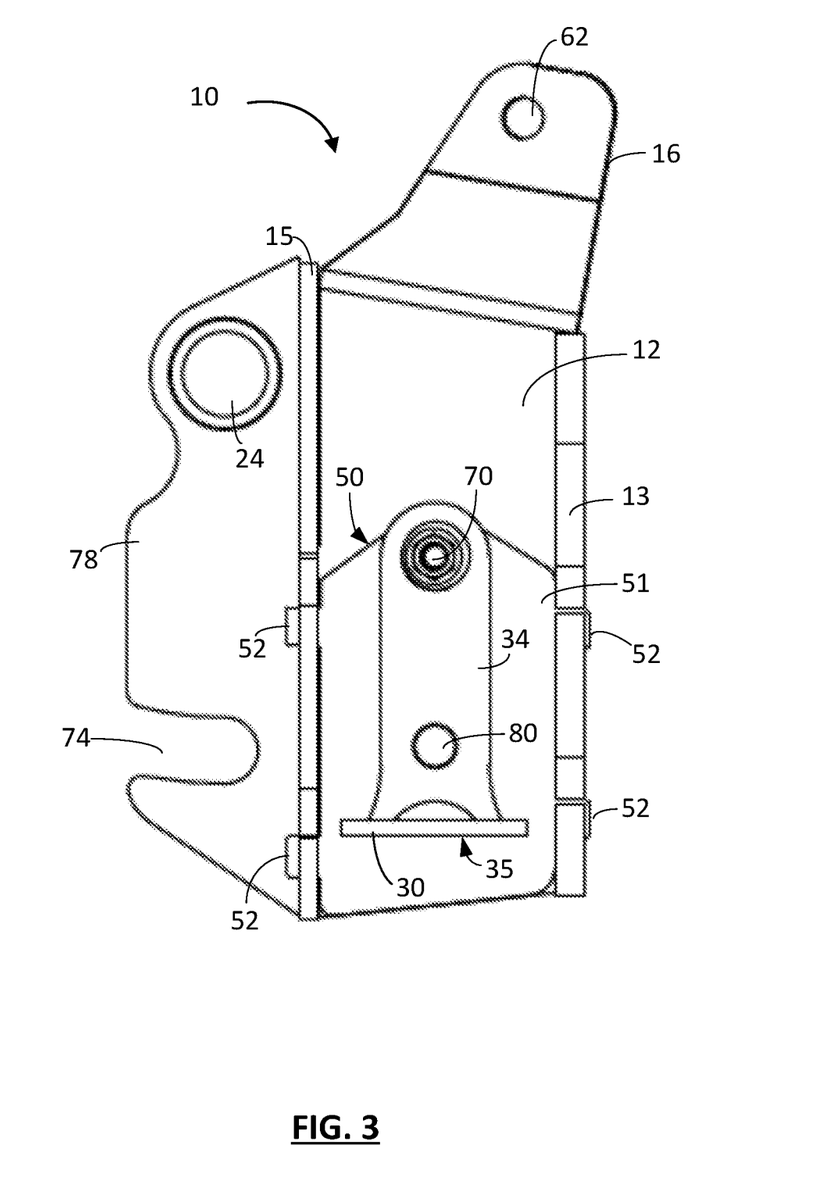
FIG. 3 is another view of the shank mounting assembly.

FIG. 3 provides an additional view of the shank mounting assembly 10 including the removeable securing assembly 50.

Figure 4:
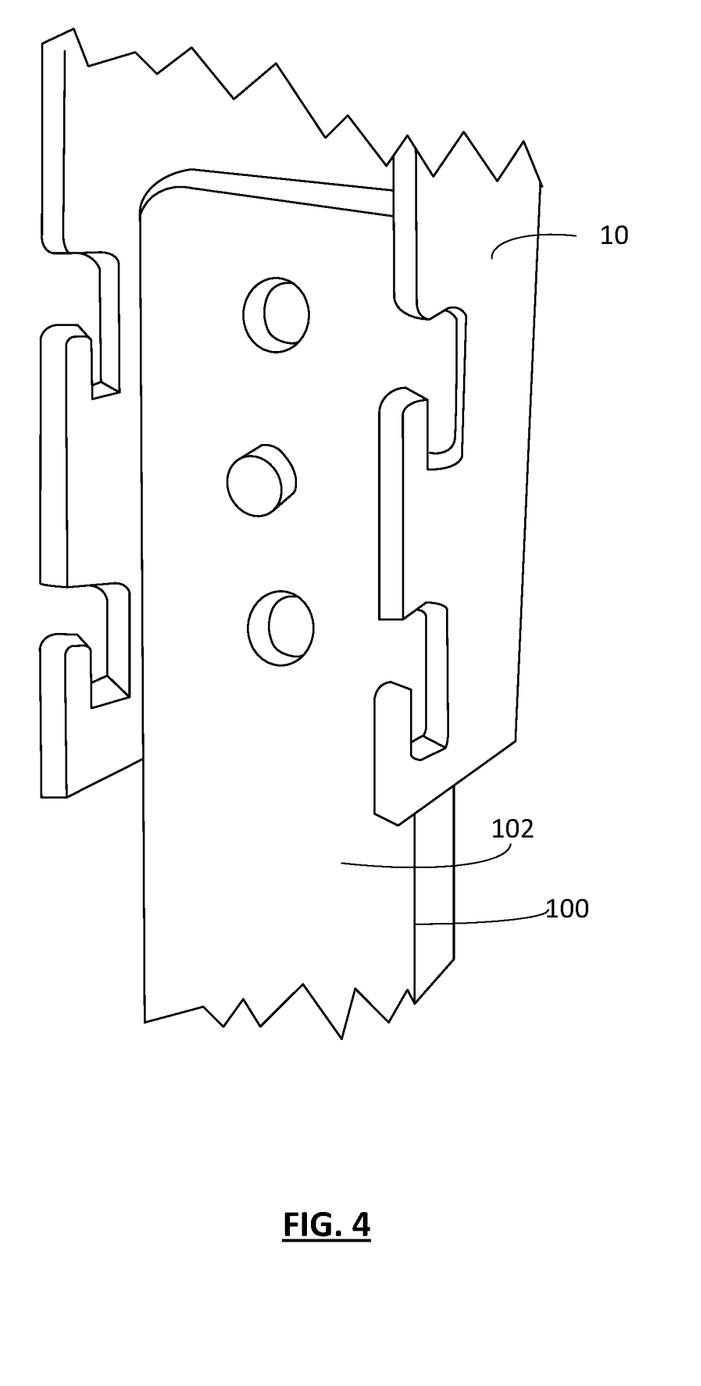
FIG. 4 illustrates one example of a shank mounted on a shank mounting assembly with the securing assembly removed.

FIG. 4 illustrates the shank mounting assembly 10 with a shank 100 with a connecting end 102 of the shank 100 shown. The shank mounting assembly 10 is mounted on a row unit of a tillage implement. The opposite end of the shank is a tool supporting end (not shown).

Figure 5:
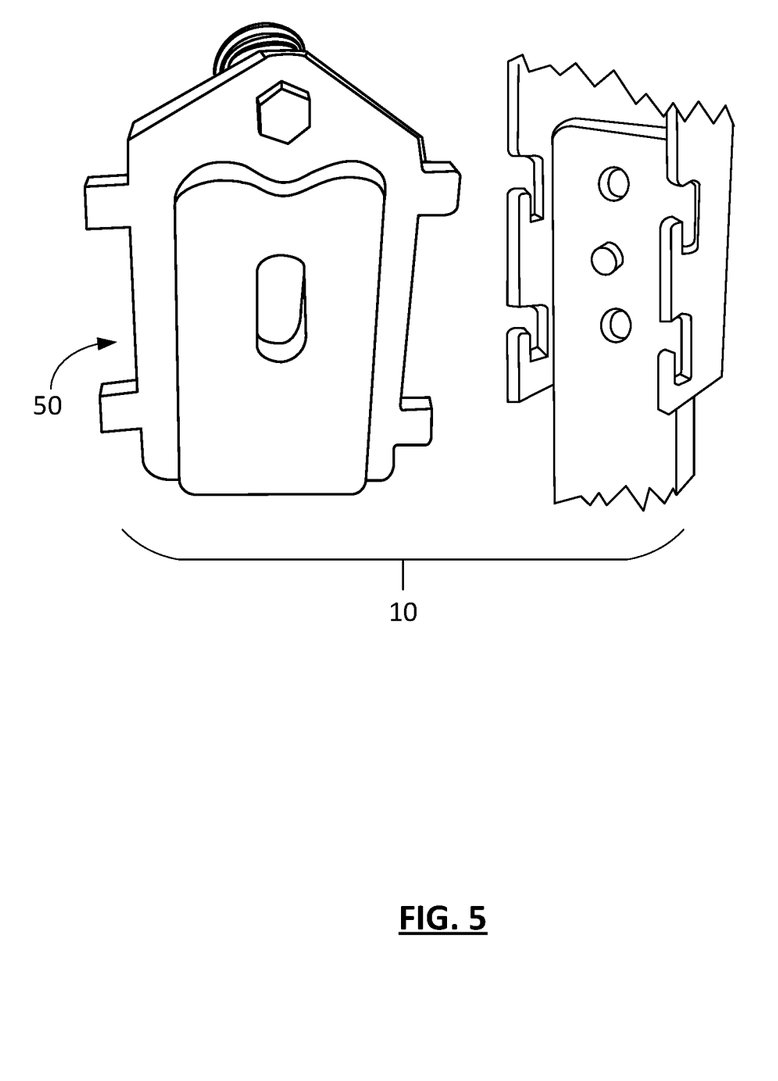
FIG. 5 illustrates a securing assembly separated from the remaining portion of the shank mounting assembly.

FIG. 5 further illustrates the shanking mounting assembly 10 with the removeable securing assembly 50 removed.

Figure 6:
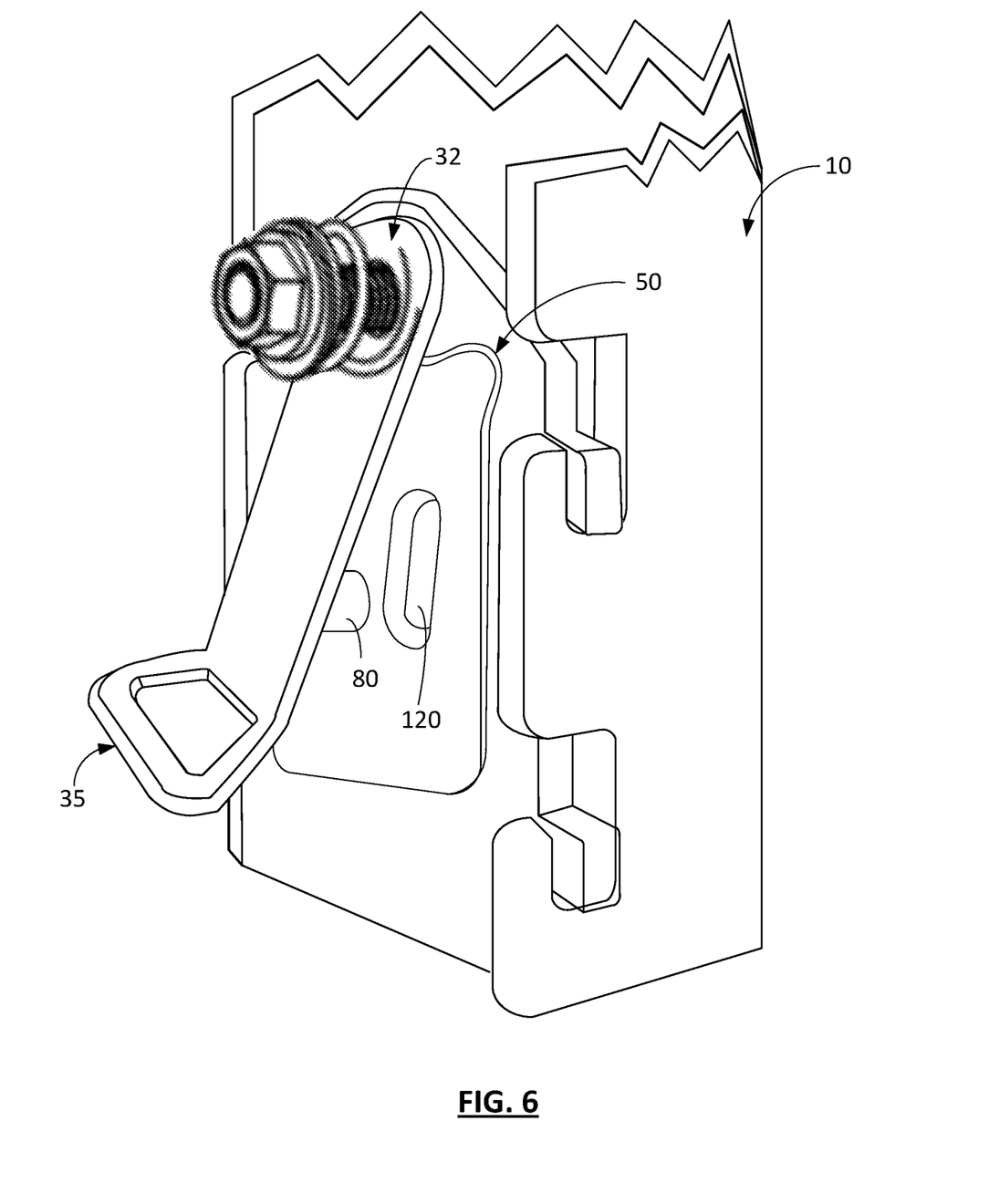
FIG. 6 illustrates the shank mounting assembly during the process of securing or removing the securing assembly to the remainder of the shank mounting assembly.

FIG. 6 illustrates the shank mounting assembly 10 where there is an aperture 120 in the central flat plate 51. The integrated pin 80 of the handle assembly 35 fits into the aperture 120. Note that the bias assembly 32 helps provides for biasing which helps provide a secure fit during field operations but still allows for easy removal of the removeable securing assembly 50.

Figure 7:
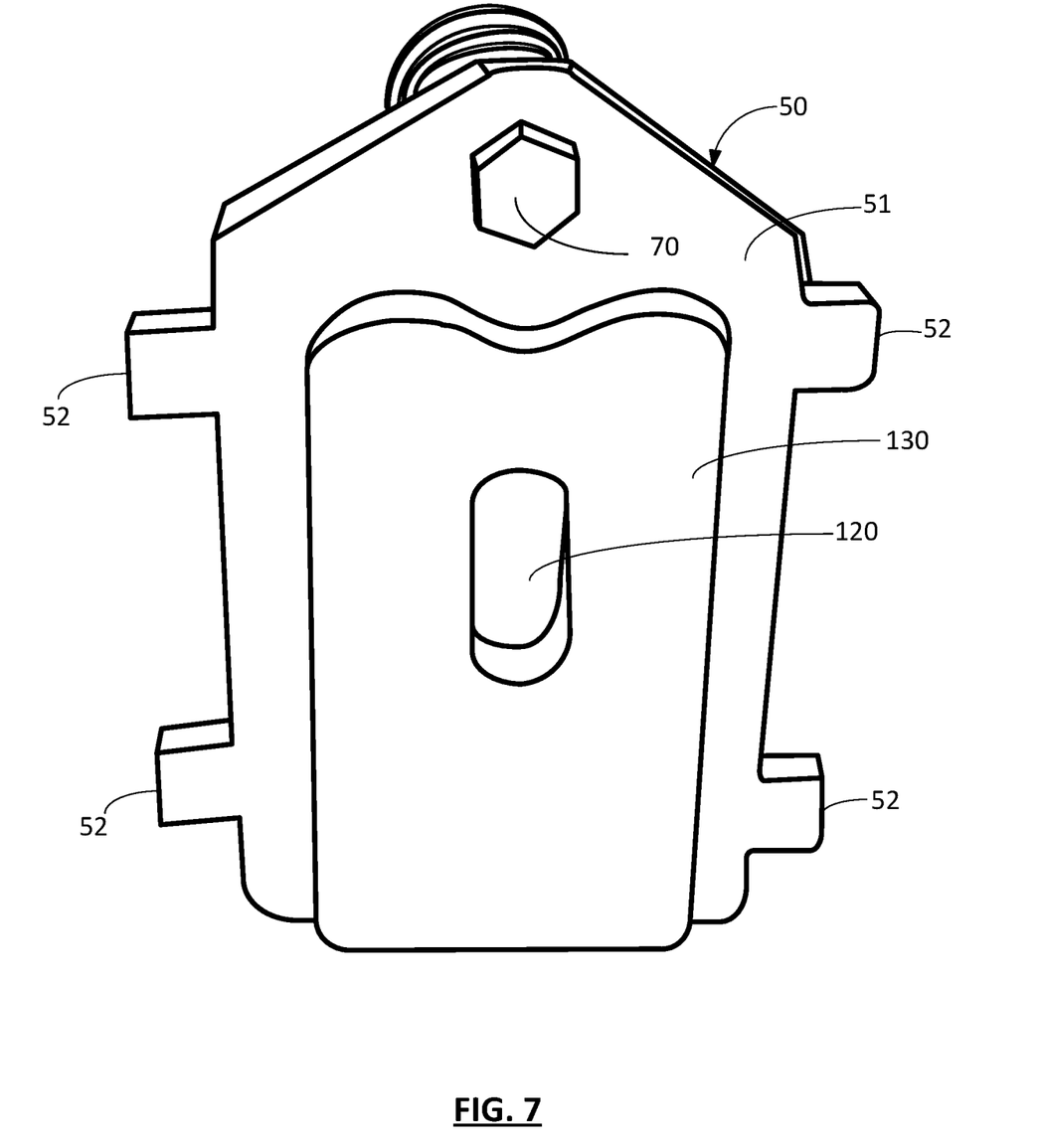
FIG. 7 illustrates the securing assembly.

FIG. 7 illustrates the removeable securing assembly 50 including a back side of the flat plate 51 and an inner plate 130 which may be welded to the flat plate 51. Alternatively, the flat plate 51 and the inner plate 130 may be cast or otherwise formed. The bolt 70 is shown extending through the inner plate 51. The aperture 120 is also shown.

Figure 8:
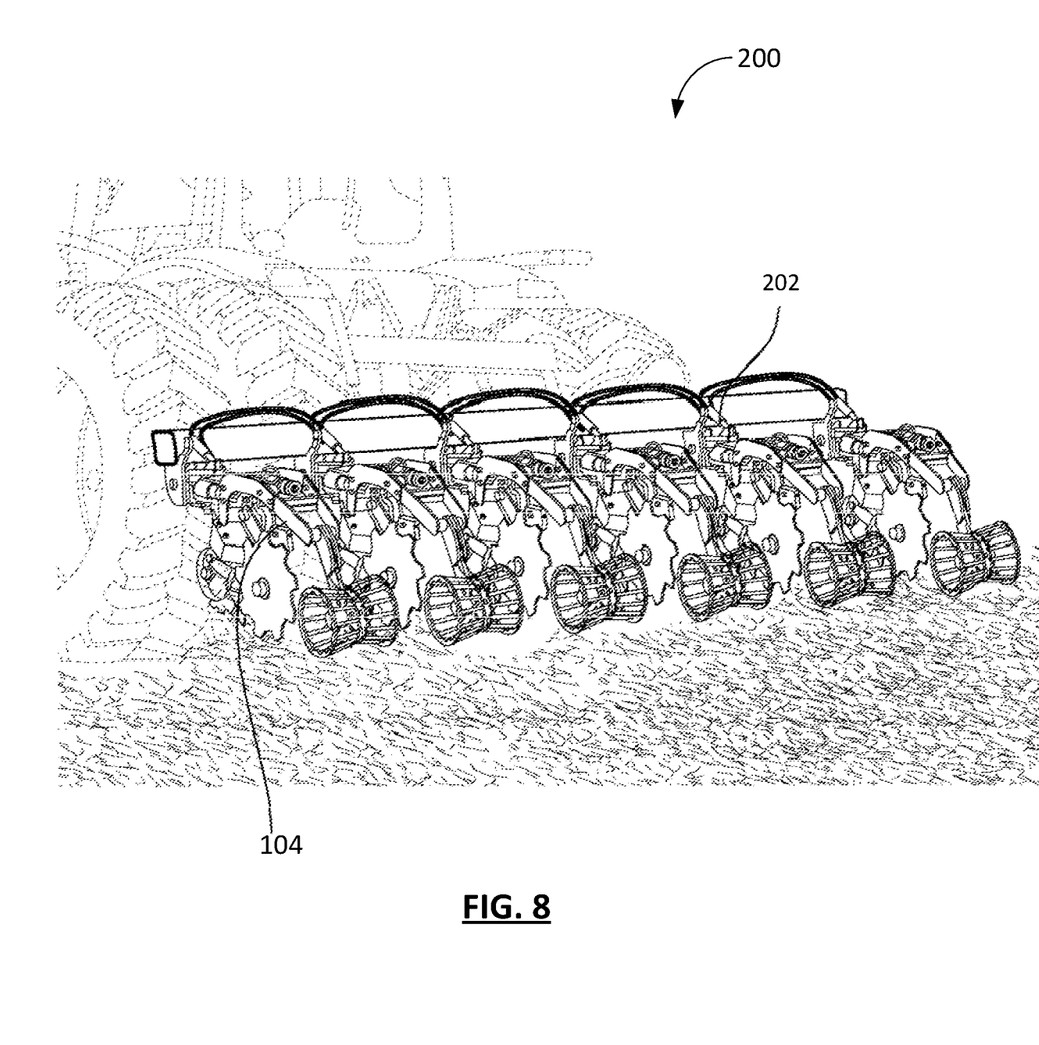
FIG. 8 illustrates one example of an agricultural implement in the form of a tillage implement which may incorporate the shank mounting assembly.

FIG. 8 illustrates one example of an agricultural implement in the form of a tillage implement 200 which may incorporate the shank mounting assembly shown and described. The tillage implement shown has a frame 202 and multiple row units 104 which each may have a shank mounting assembly.

The invention is not to be limited to the particular embodiments described herein. In particular, the invention contemplates numerous variations in size and shape of the various structure. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A tillage implement comprising:
   a frame;
   a row unit attached to the frame;
   a shank having a connecting end and an opposite tool-supporting end, the shank extending downwardly from the connecting end to the tool-supporting end;
   a shank mounting assembly for connecting the shank to the row unit, the shank mounting assembly comprising a fixed portion mounted to the row unit and a removable portion;
   the fixed portion comprising:
      a left wall and a right wall extending outwardly;
      a plurality of slots in each of the left wall and the right wall;
   the removable portion comprising:
      a plate having a first set of hooks for mating with the plurality of the slots in the left wall and a second set of hooks for mating with the plurality of the slots in the right wall;
      a slot extending through a central portion of the plate;
      a handle assembly operatively connected to the plate; and
      a pin integrated into the handle assembly for extending through the slot extending through the central portion of the plate.

2. The tillage implement of claim 1 wherein the connecting end of the shank is sized and shaped to fit into the fixed portion of the at least one shank mounting assembly and wherein in an operative position the connected end of the shank is secured into the fixed portion with the removable portion.

3. The tillage implement of claim 1 wherein the connecting end of the shank has an aperture for fitting on a pin for supporting the shank while the connecting end of the shank is positioned within the fixed portion of the shank mounting assembly.

4. The tillage implement of claim 1 further comprising an aperture in the plate and an aperture in the handle assembly wherein in an operative position the aperture in the plate and the aperture in the handle assembly are aligned.

5. The tillage implement of claim 4 further comprising a spring biased bolt inserted through the aperture in the plate and the aperture in the handle assembly.

6. A shank mounting assembly for connecting a shank to a row unit of a tillage implement, the shank mounting assembly comprising:
   a fixed portion, the fixed portion comprising a left wall and a right wall extending outwardly and a plurality of slots in each of the left wall and the right wall;
   a removable portion comprising a plate having a first set of hooks for mating with the plurality of the slots in the left wall and a second set of hooks for mating with the plurality of the slots in the right wall;
   a handle assembly operatively connected to the plate;
   a slot extending through a central portion of the plate; and
   a pin integrated into the handle assembly for extending through the slot extending through the central portion of the plate.

7. The shank mounting assembly of claim 6 further comprising an aperture in the plate and an aperture in the handle assembly wherein in an operative position the aperture in the plate and the aperture in the handle assembly are aligned.

8. The shank mounting assembly of claim 7 further comprising a spring biased bolt inserted through the aperture in the plate and the aperture in the handle assembly.

9. A tillage implement comprising the shank mounting assembly of claim 8.

* * * * *